Feb. 10, 1925.

C. G. WENNERSTROM

ICE CREAM FREEZER

Original Filed Sept. 17, 1921

1,525,527

Patented Feb. 10, 1925.

1,525,527

UNITED STATES PATENT OFFICE.

CARL GUSTAV WENNERSTROM, OF CHICAGO, ILLINOIS, ASSIGNOR, BY MESNE ASSIGNMENTS, TO THE CREAMERY PACKAGE MFG. COMPANY, OF CHICAGO, ILLINOIS, A CORPORATION OF ILLINOIS.

ICE-CREAM FREEZER.

Original application filed September 17, 1921, Serial No. 501,359. Divided and this application filed November 8, 1921. Serial No. 513,721.

*To all whom it may concern:*

Be it known that I, CARL GUSTAV WENNERSTROM, a subject of the King of Sweden, and a resident of the city of Chicago, county of Cook, State of Illinois, have invented certain new and useful Improvements in Ice-Cream Freezers, of which the following is a specification.

This invention relates to ice cream freezers of the type shown and described in my Patent No. 1,447,497, granted March 6, 1923, on my application filed September 17, 1921, bearing Serial Number 501,359, of which this application is a division.

An important object of the invention is to provide a novel arrangement of brine or other freezing medium carrying coils, so constructed and disposed as to make possible, the maintenance of a substantially uniform temperature throughout the length of the freezing chamber, and to further make possible, efficient utilization of a freezing medium having a relatively high temperature at the inlet end of said coils.

A further object of the invention is to provide in a device of the above mentioned character, a means cooperatively related to the brine or freezing medium carrying coils, whereby the rate of flow of the freezing medium to and from said coils may be simultaneously governed to enable the operator to maintain a given or predetermined temperature within the freezing chamber.

Further objects and advantages of the invention will become apparent from a study of the following specification when taken in connection with the acompanying drawings in which—

Figure 1:
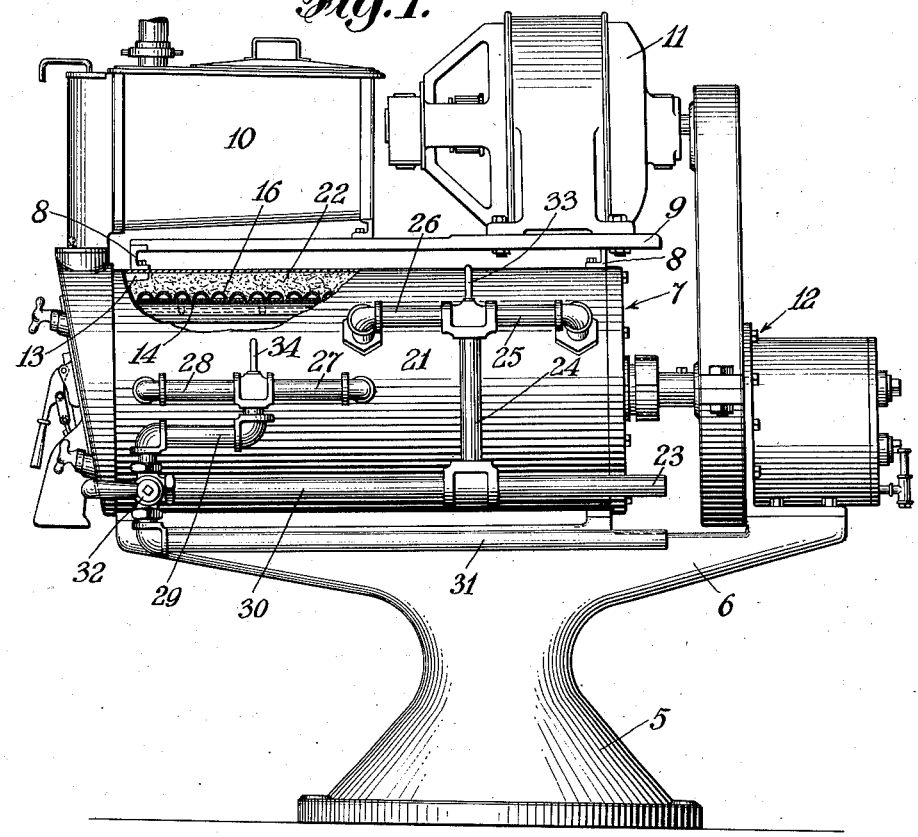
Figure 1 is a side elevation of a freezer embodying my invention, a portion of the freezing chamber and housing therefor being broken away to show the relative position of certain internal elements.

In the drawings the numeral 5 indicates a base having an elongated head 6 upon which is carried a freezer unit indicated as a whole by the numeral 7, the freezing unit being provided with a pair of brackets 8 carrying a longitudinally disposed support 9 upon which is mounted a supply tank 10 adapted to receive and transmit to the freezing cylinder a quantity of cream or other liquid to be frozen.

Within the freezing unit 7 there is arranged a suitable agitating mechanism, comprising dasher and whipping elements, not shown, which are adapted to be rotated in opposite directions by means of a motor 11 mounted upon the support 9, the power of rotation being transmitted to the agitating mechanism by means of a suitable transmission gearing, not shown, carried within a suitably constructed gear casing indicated by the numeral 12.

Figure 2:
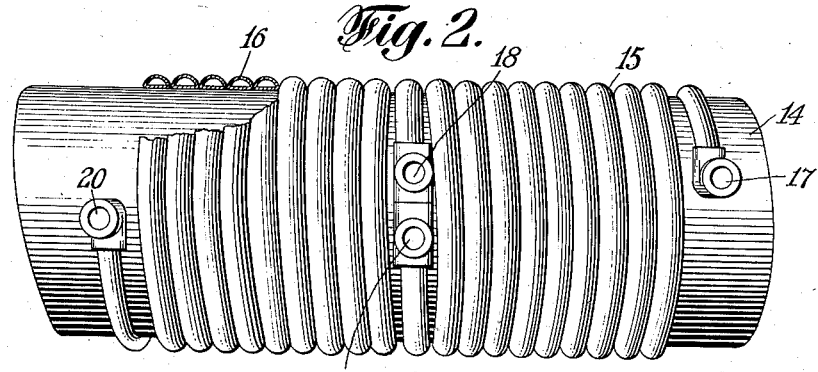
Figure 2 is a side elevation of a plurality of brine or freezing medium carrying coils, the coils being shown as disposed in an end to end or axial relation about the freezing chamber.

The freezing unit 7 comprises a pair of end rings, one of which is indicated by the numeral 13, the rings being arranged to support centrally thereof, a horizontally disposed freezing cylinder 14 into which the cream or other mixture is passed from the supply tank 10. A plurality of brine or other freezing medium carrying coils 15 and 16 are disposed about the freezing cylinder 14 in an axial or end to end relation. These coils in cross section are D-shaped and are so arranged as to intimately contact with the outer surface of the freezing cylinder 14 substantially throughout its length as shown in Figure 2 and are provided respectively with inlet openings 17, 18 and with outlet opening 19, 20. It will be noted that the inlet openings and outlet openings of these coils are disposed respectively in parallel planes in order that the supply conduits and outlet conduits hereinafter more particularly referred to, may be connected respectively to the inlet and outlet openings in such a manner as to necessitate the least possible number of unions or connections, and to simplify as far as possible, the arrangement of the brine or other freezing medium supply and return pipes. In order to suitably house or enclose the freezing cylinder 14 and the coils associated therewith, I provide a cover or housing 21, which at its ends is secured to the rings 13. Within the spaces afforded between the housing 21 and the freezing cylinder 14 there is carried a quantity of insulating material 22, such as cork or the like, which serves as is obvious to prevent absorption of heat by the material while being frozen within the freezing cylinder.

The brine or other freezing medium is supplied to the coils 15 and 16 from a suitable source of supply through a pipe 23 to which is connected a delivery pipe 24 carrying at its upper end a pair of intake branches 25 and 26 which are secured to the housing 21 and arranged to communicate with the coils 15 and 16 through their respective inlet openings 17 and 18. To the housing 21 in a horizontal plane substantially parallel to the branches 25 and 26, there is connected a pair of take-off conduits 27 and 28 arranged to communicate with the coils 15 and 16 through their respective outlet openings 19 and 20. The take-off pipes 27 and 28 are connected to a single conduit 29 which is adapted to communicate with a shunting pipe 30, connected with the supply pipe 23, and further adapted to communicate with a return pipe 31. By prividing a two-way valve 32 of ordinary construction at the junction or union of the conduit 29 the shunting pipe 30 and the return pipe 31, I am enabled to sever communication between the conduit 29 and the return pipe 31 and simultaneously establish direct communication between the return pipe 31 and the shunting pipe 30 which communicates with the supply pipe 23. By severing communication between the conduit 29 and the return pipe 31 and establishing communication between the return pipe 31 and the shunting pipe 30, the circulation of the brine or other freezing medium through the coils 15 and 16 is discontinued and is returned to the source of supply through the return pipe 31. On the other hand to circulate the brine or other freezing medium through the coils 15 and 16, the valve 32 may be so moved as to sever communication between the shunting pipe 30 and the return pipe 31, and simultaneously establish communication between the latter named pipe and the supply pipe 23 through the conduit 29, the take-off pipes 27 and 28, the coils 15 and 16, the branch pipes 25 and 26, and the delivery pipe 24. Inasmuch as the valve 32 affords a simultaneous opening and closing of the various pipes, one with the other as above described, I am enabled to so vary or govern the flow of brine or other freezing medium through the coils 15 and 16 as to maintain a constant or substantially constant temperature within the freezing cylinder 14, which temperature may be determined or approximated by noting the readings of the thermometers 33 and 34 which are so disposed as to indicate the temperature of the brine or other freezing medium as it enters and passes from the coils 15 and 16.

By reason of the fact that I employ a plurality of individual freezing coils, each of which surrounds only a relatively short portion of the freezing cylinder, I am enabled to efficiently operate the machine with a freezing medium having a relatively high temperature, as compared with the temperature which it is necessary to maintain in a freezing medium employed in similar machines having only a single coil extending throughout or substantially throughout the length of the freezing cylinder, inasmuch as the temperature of the freezing medium is not so materially affected during its passage through these relatively short coils as it would be otherwise, and consequently it may be introduced at a relatively higher temperature and yet be maintained at a freezing temperature throughout its length of travel.

I claim:

1. An ice cream freezer comprising a freezing cylinder, a plurality of freezing coils surrounding adjacent freezing zones of said cylinder and adapted to convey a freezing medium, a common means for supplying said coils with a freezing medium, a common means for conducting a freezing medium away from said coils, and means for simultaneously governing the flow of freezing medium to and from said coils.

2. An ice cream freezer comprising a freezing cylinder, a plurality of freezing coils adapted to carry a freezing medium and having inlet and outlet openings, said coils being coiled around said cylinder and having flattened surfaces adapted for intimate contact with said cylinder, a freezing medium delivery conduit communicating with all of said coils through their inlet openings, and a freezing medium discharge conduit communicating with all of said coils through their outlet openings.

3. An ice cream freezer comprising a freezing cylinder, a plurality of freezing coils adapted to carry a freezing medium and having inlet and outlet openings, said coils being coiled around said cylinder and having flattened surfaces adapted for intimate contact with said cylinder, a freezing medium delivery conduit communicating with all of said coils, through their inlet openings, a freezing medium discharge conduit communicating with all of said coils through their outlet openings, a return pipe adapted to communicate with said discharge conduit, and means for severing communication between said return pipe and discharge conduit and simultaneously establishing communication between said return pipe and said delivery pipe.

In testimony whereof I have affixed my signature to this specification.

CARL GUSTAV WENNERSTROM.